United States Patent
Lippitt et al.

(10) Patent No.: US 9,465,550 B1
(45) Date of Patent: Oct. 11, 2016

(54) TECHNIQUES FOR IMPROVED SERVICE LEVEL OBJECTIVE FULFILLMENT

(71) Applicant: EMC Corporation, Hopkinton, MA (US)

(72) Inventors: Mark Lippitt, Westborough, MA (US); Erik P. Smith, Douglas, MA (US); Helen S. Raizen, Jamaica Plain, MA (US); Arieh Don, Newton, MA (US); Ajith Balakrishnan, Karanataka (IN)

(73) Assignee: EMC Corporation, Hopkinton, MA (US)

( * ) Notice: Subject to any disclaimer, the term of this patent is extended or adjusted under 35 U.S.C. 154(b) by 42 days.

(21) Appl. No.: 14/314,458

(22) Filed: Jun. 25, 2014

(51) Int. Cl.
*G06F 3/00* (2006.01)
*G06F 3/06* (2006.01)

(52) U.S. Cl.
CPC ............ *G06F 3/0613* (2013.01); *G06F 3/067* (2013.01); *G06F 3/0659* (2013.01); *G06F 3/0601* (2013.01); *G06F 3/061* (2013.01)

(58) Field of Classification Search
None
See application file for complete search history.

(56) References Cited

U.S. PATENT DOCUMENTS

| | | | | |
|---|---|---|---|---|
| 8,706,701 B1 * | 4/2014 | Stefanov | .................. | G06F 7/00 707/687 |
| 8,782,795 B1 * | 7/2014 | Field | .................... | H04L 63/205 726/25 |
| 2011/0246419 A1 * | 10/2011 | Yancey | ............. | G06F 17/30557 707/624 |
| 2011/0258630 A1 * | 10/2011 | Fee | ........................ | G06F 9/4843 718/101 |
| 2012/0030502 A1 * | 2/2012 | Rueegg | ............... | G06F 11/0709 714/4.1 |
| 2012/0226803 A1 * | 9/2012 | Bharadwaj | .......... | H04L 41/0253 709/224 |
| 2013/0138891 A1 * | 5/2013 | Chockler | .............. | G06F 9/5016 711/133 |
| 2013/0185729 A1 * | 7/2013 | Vasic | .................... | G06F 9/5072 718/104 |
| 2013/0262685 A1 * | 10/2013 | Shelton | ................... | G06F 1/206 709/226 |
| 2014/0122706 A1 * | 5/2014 | Boerner | .................. | H04L 41/12 709/224 |

* cited by examiner

*Primary Examiner* — Henry Tsai
*Assistant Examiner* — Aurangzeb Hassan
(74) *Attorney, Agent, or Firm* — Muirhead and Saturnelli, LLC

(57) ABSTRACT

Described are techniques for achieving service level objectives. A first service level objective for a first tenant of a data storage system may be received. The first tenant may have data stored in a first set of devices of the data storage system. The first service level objective may include a first value for a first metric. The first tenant may be located on a first host and may issue I/O operations directed to the first set of devices. A first calculated value for the first metric may be determined using one or more measured values obtained at the first host. It may be determined, using the first calculated value for the first metric, whether the first service level objective for the first tenant is violated. Responsive to determining the first service level objective for the first tenant is violated, first processing may be performed to selects a remediation action.

17 Claims, 9 Drawing Sheets

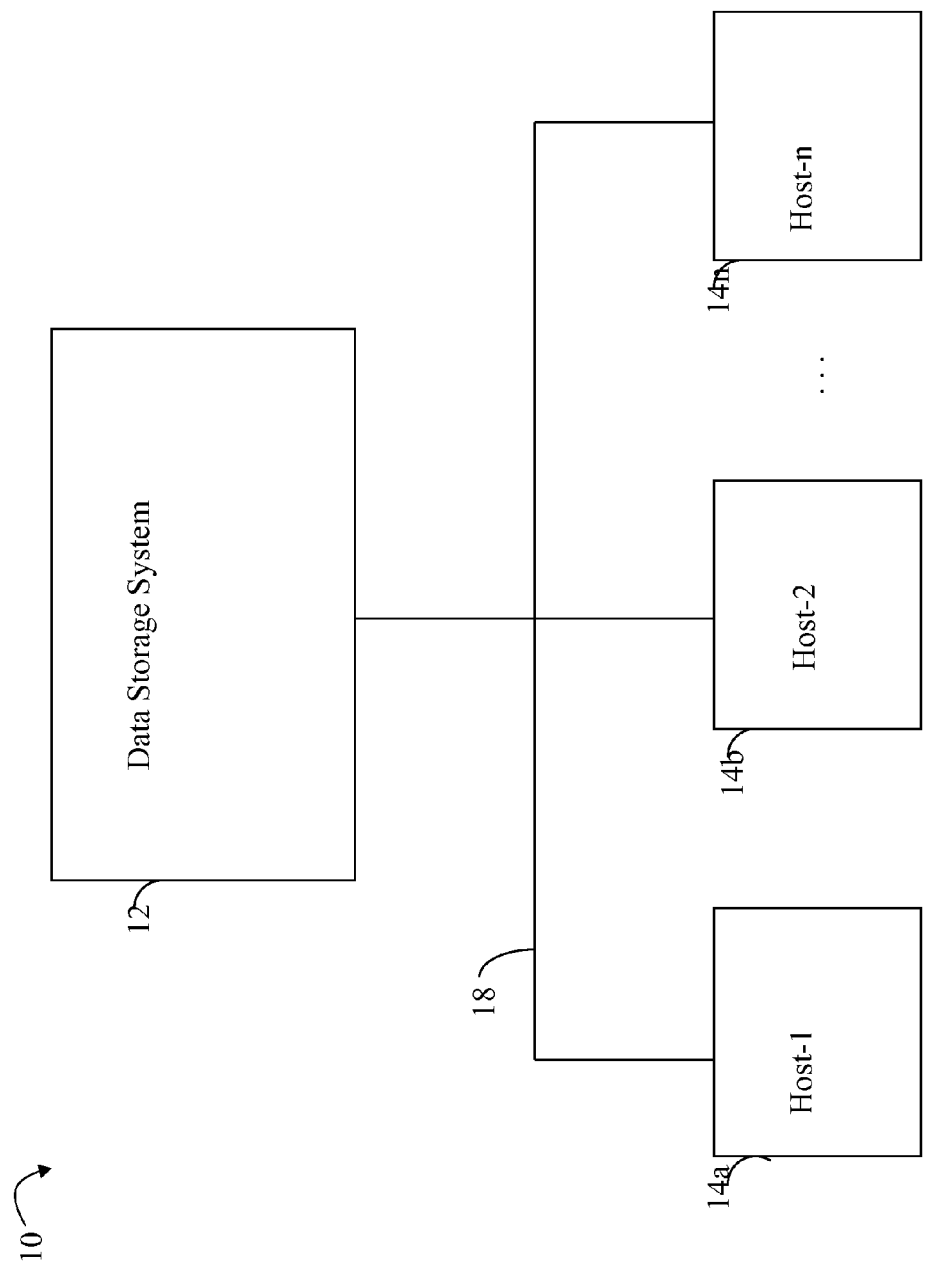

TECHNIQUES FOR IMPROVED SERVICE LEVEL OBJECTIVE FULFILLMENT

BACKGROUND

1. Technical Field

This application generally relates to data storage systems, and more particularly to techniques for achieving service level objectives (SLOs) such as used in connection with data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

An application may execute on a host where the application performs I/O (input/output) operations. The host may be able to transmit the data operation to the data storage system over any one or more different paths or multiple paths. Multipathing functionality, such as for path selection and management of the multiple paths, may be handled by a device driver of the host. When an application on the host issues an I/O operation, it may be received by a device driver of the host which facilitates sending and/or receiving transmissions between the application and the data storage system.

SUMMARY OF THE INVENTION

In accordance with one aspect of the invention is a method of achieving service level objectives comprising: receiving a first service level objective for a first tenant of a data storage system whereby the first tenant has data stored in a first set of one or more devices of the data storage system, said first service level objective including a first value for a first metric, wherein said first tenant is located on a first host and issues I/O operations directed to the first set of one or more devices of the data storage system; determining a first calculated value for the first metric using one or more measured values obtained at the first host; determining, using the first calculated value for the first metric, whether the first service level objective for the first tenant is violated; and responsive to determining that the first service level objective for the first tenant is violated, performing first processing that selects a first remediation action. The first metric may be any of a response time, a data throughput rate, an I/O throughput rate. The first tenant may include one or more applications executing on the first host that issue I/O operations directed to the first set of one or more devices of the data storage system. Determining whether the first service level objective for the first tenant is violated may include determining whether the first calculated value for the first metric is greater than the first value for the first metric, and wherein a violation of the first service level objective may be determined when the first calculated value for the metric is greater than the first value of the first metric. Determining whether the first service level objective for the first tenant is violated may include determining whether the first calculated value for the first metric is within a range of values having a lower bound and an upper bound, the lower bound being the result of the first value minus a threshold amount and the upper bound being a result of the threshold amount added to the first value, and wherein a violation of the first service level objective may be determined when the first calculated value for the metric is not within the range of values. The first processing may include determining, in accordance with one or more criteria, whether to perform network remediation; and if it is determined to perform network remediation, performing second processing including: selecting a network remediation action; and performing the network remediation action. If it is determined not to perform network remediation, third processing may be performed that includes determining, in accordance with one or more criteria, whether to perform data storage system remediation; and if it is determined to perform data storage remediation, performing third processing including: selecting a data storage system remediation action; and performing the data storage system remediation action. If it is determined not to perform data storage system remediation, fourth processing may be performed that includes selecting a host remediation action; and performing the host remediation action. The first service level objective for the first tenant may include a second value for the first metric, wherein the first calculated value for the first metric may be calculated using one or more measured values that are associated with write operations issued from the first host. The first value for the first metric may be applied in connection with guaranteeing a performance level associated with write operations. The second value for the first metric may be applied in connection with guaranteeing a performance level associated with read operations. The method may also include determining a second calculated value for the first metric using one or more measured values that are associated with read operations and obtained at the first host; and wherein determining whether the first service level objective for the first tenant is violated further includes: comparing the first calculated value for the first metric to any of the first value for the first metric and a first range of values, the first range of values having a first lower bound and a first upper bound, the first lower bound being the result of the first value minus a first threshold amount and the first upper bound being a result of the first threshold amount added to the first value; and comparing the second calculated value for the first metric to any of the second value for the first metric and a second range of values, the second range of values having a second lower bound and a second upper bound, the second lower bound being the result of the second value minus a second threshold amount and the second upper bound being a result of the second threshold amount added to the second value. Determining whether the first service level objective for the first tenant is violated may be based on said comparing the first calculated value for the first metric to any of the first value for the first metric and the first range of values and said comparing the second calculated value for the first metric to any of the second value for the first metric and the second range of values. The first processing may include selecting a first type of remediation in accordance with a set of one or more criteria including any of correlating a current service level objective violation with conditions or phenomena of the network, data storage system and/or host, a remediation action type of one or more previous remediation actions taken in connection with one or more previous service level objective violations; and selecting the first remediation action of the first type of remediation in accordance with one or more action selection criteria including any of a type of I/O operation associated with the current service level objective violation, data regarding any of workload, performance and resource consumption, and expected impact, due to implementing a candidate action, on one or more other tenants that issue I/O operations to the data storage system. The first tenant may be one of a plurality of tenants having data stored on the data storage system. The plurality of tenants may include a second tenant and wherein a second service level objective may be defined for the second tenant. The first metric may be response time and the method may include determining that the first service level objective for the first tenant is violated, wherein the first calculated value for the first metric is lower than the lower bound of the range, and wherein the first remediation action includes reducing an amount of at least one resource used by the first tenant, wherein the at least one resource is a resource from any of the first host, a network and the data storage system. The first value for the first metric may indicate a guaranteed level of performance for any of an application of the first tenant, each single device of the first set of the first tenant, as an aggregate with respect to the first set of one or more devices, and as an aggregate with respect to multiple applications of the first tenant.

In accordance with another aspect of the invention is a data storage system comprising: one or more processors; one or more physical storage devices wherein storage is provisioned from the one or more physical storage devices for a first set of one or more logical devices; a memory comprising code stored therein that, when executed by a processor, performs a method comprising: receiving a first service level objective for a first tenant of a data storage system whereby the first tenant has data stored in the first set of one or more logical devices, said first service level objective including a first value for a first metric, wherein said first tenant is located on a first host and issues I/O operations directed to the first set of one or more logical devices of the data storage system; determining a first calculated value for the first metric using one or more measured values obtained at the first host; determining, using the first calculated value for the first metric, whether the first service level objective for the first tenant is violated; and responsive to determining that the first service level objective for the first tenant is violated, performing first processing that selects a first remediation action.

In accordance with another aspect of the invention is a non-transitory computer readable medium comprising code stored thereon that achieves service level objectives, the non-transitory computer readable medium comprising code stored thereon that, when executed, performs a method comprising: receiving a first service level objective for a first tenant of a data storage system whereby the first tenant has data stored in a first set of one or more devices of the data storage system, said first service level objective including a first value for a first metric, wherein said first tenant is located on a first host and issues I/O operations directed to the first set of one or more devices of the data storage system; determining a first calculated value for the first metric using one or more measured values; determining, using the first calculated value for the first metric, whether the first service level objective for the first tenant is violated; and responsive to determining that the first service level objective for the first tenant is violated, performing first processing that selects a first remediation action. The one or more measured values used in determining the first calculated value for the first metric may be based on measurements observed from the first host. The one or more measured values used in determining the first calculated value for the first metric may be based on measurements observed at the data storage system and network between the first host and data storage system. The first value for the first metric of the first service level objective may specify a guaranteed performance level measured at the first host for the first tenant.

BRIEF DESCRIPTION OF THE DRAWINGS

Features and advantages of the present invention will become more apparent from the following detailed description of exemplary embodiments thereof taken in conjunction with the accompanying drawings in which:

FIG. 1 is an example of an embodiment of a computer system that may utilize the techniques described herein;

DETAILED DESCRIPTION OF EMBODIMENT(S)

Figure 2A:
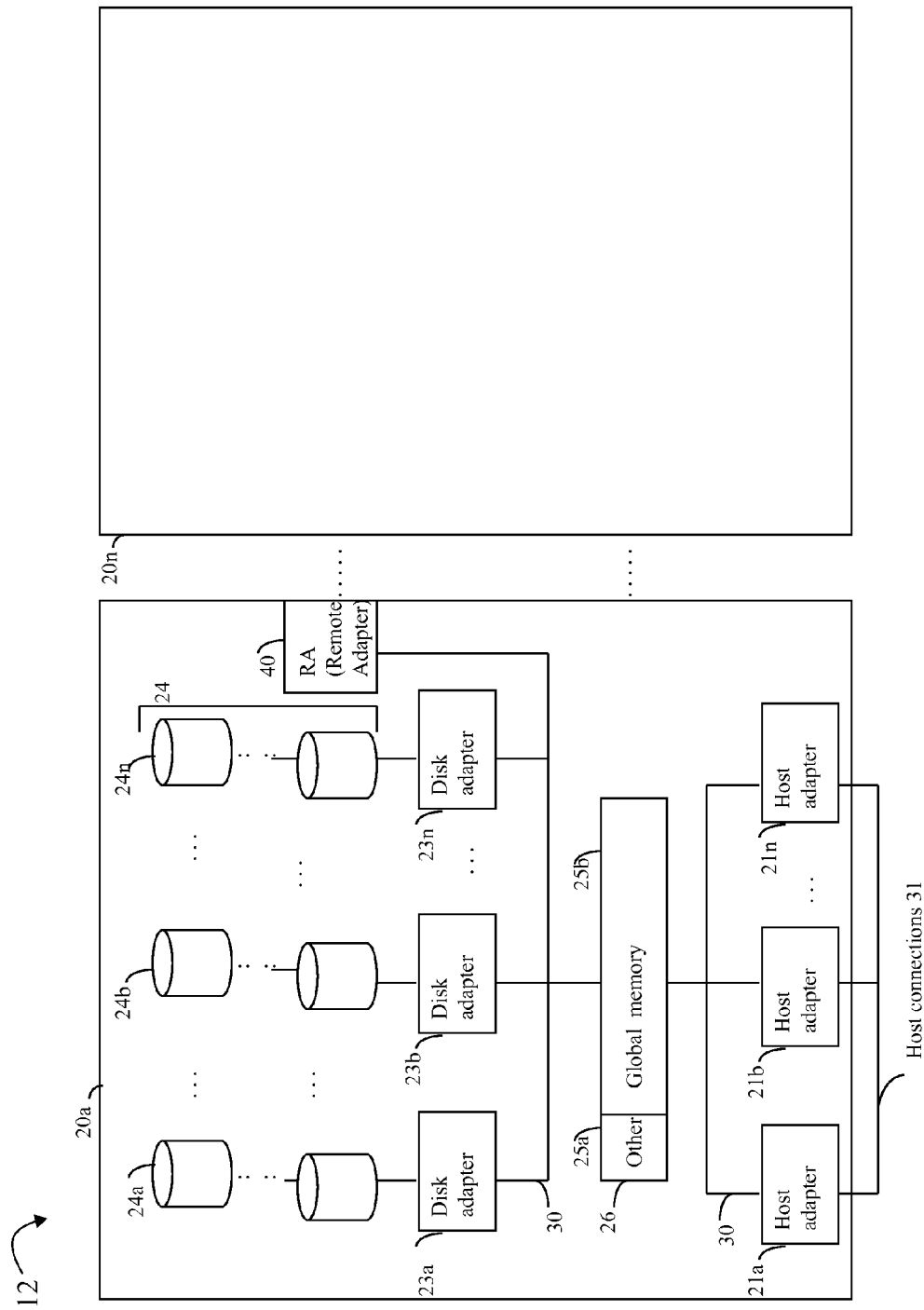
FIG. 2A is an example of an embodiment of a data storage system.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media. For example, physical devices included in an embodiment of a data storage system may include one or more types of rotating disk drives (e.g., SATA, SAS, FC 15K RPM, FC 10K RPM), one or more types of flash-based storage (e.g., SLC (single level cell) flash, MLC (multi-level cell) flash, TLC, (tri-level cell) flash) or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA performs I/O operations on a disk drive. Data residing on a disk drive may be accessed by the DA following a data request in connection with I/O operations that other directors originate.

Figure 2B:
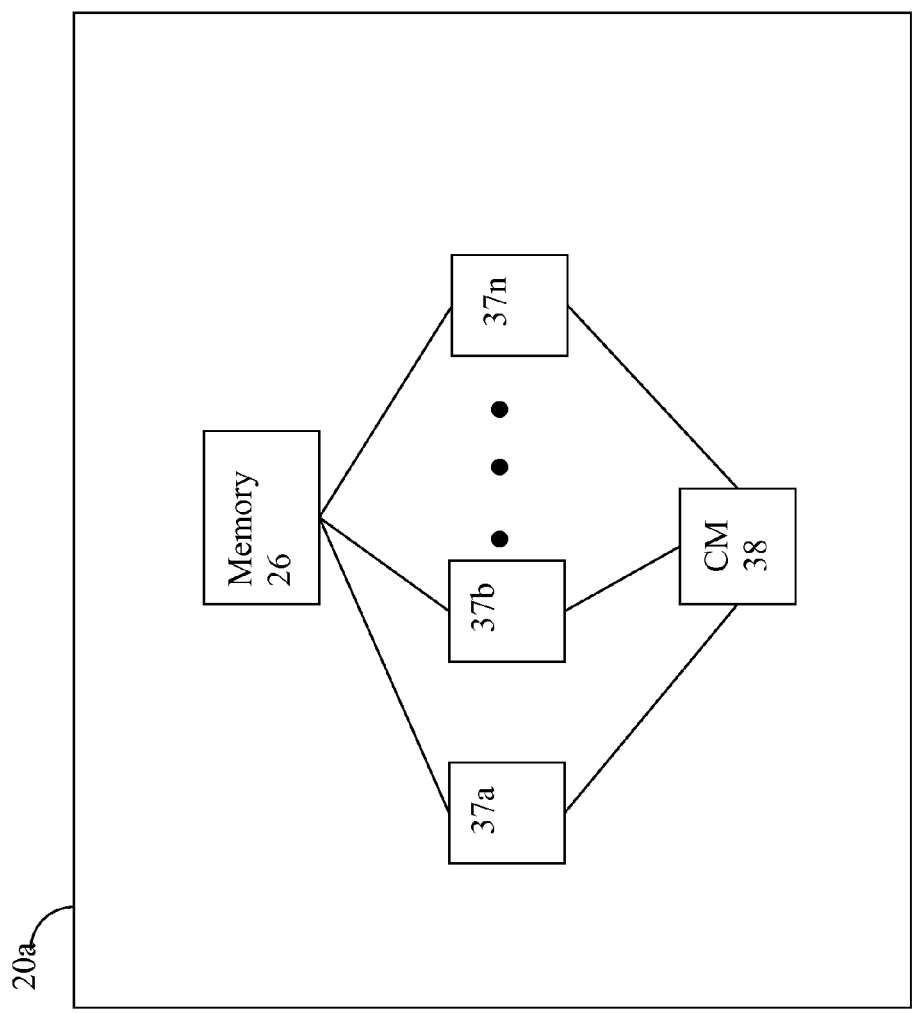
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system.

Figure 3:
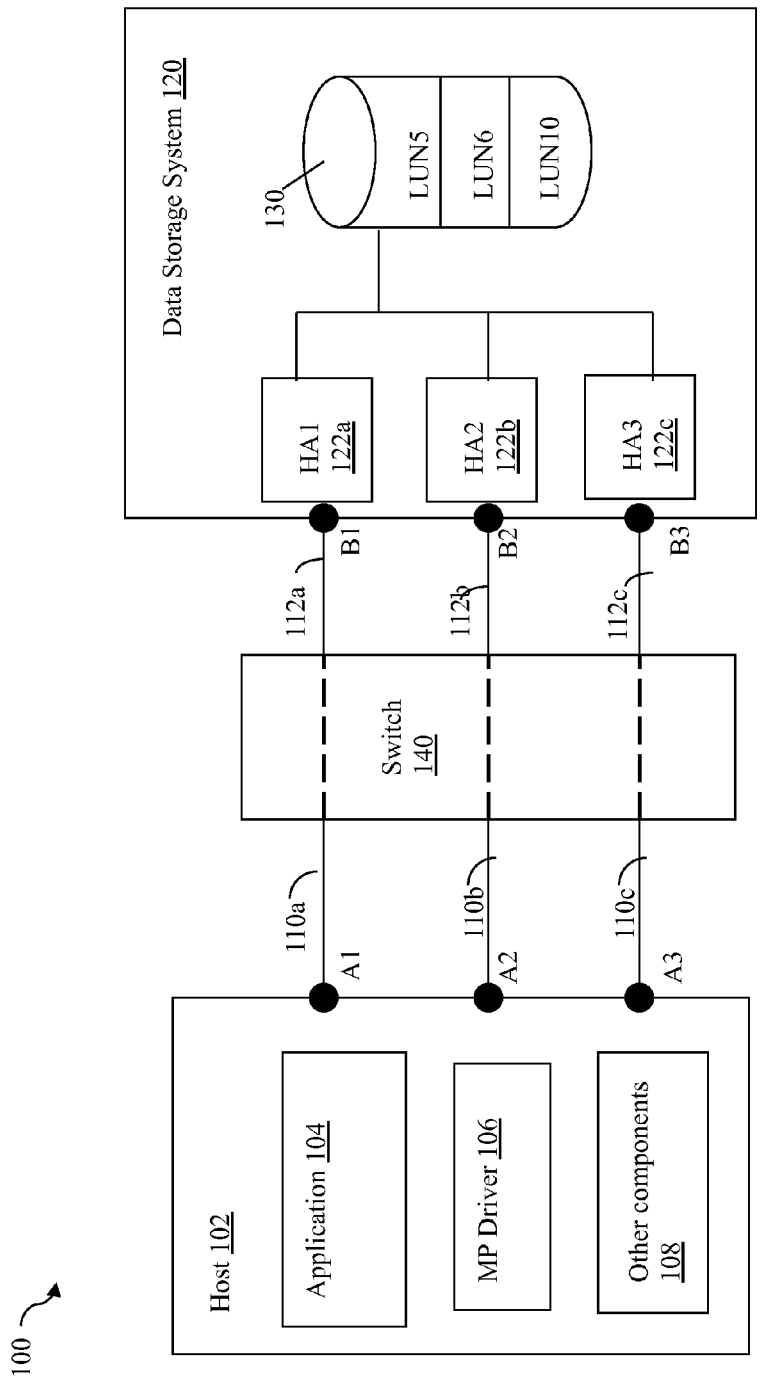
FIG. 3 is an example of a system that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The MP driver 106 may be included in a commercially available product such as, for example, EMC® PowerPath® software by EMC Corporation. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC or SCSI driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a port of an HA of the data storage system 120. Each of the LUNs of the device 130 may be accessible over three paths—a first path represented by A1-B1, a second path represented by A2-B2 and a third path represented by A3-B3.

Figure 4:
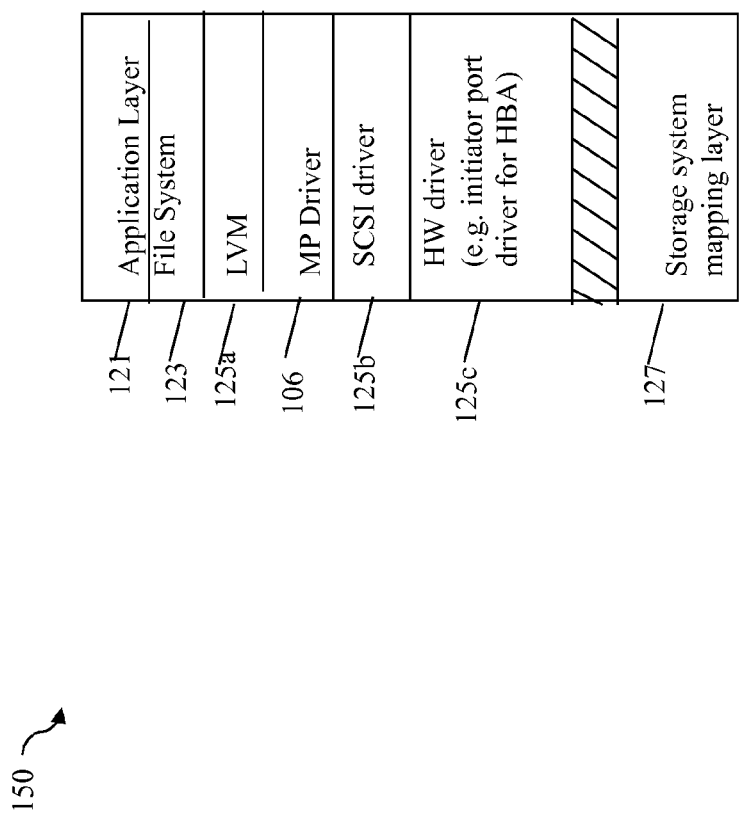
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3. The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as EMC® PowerPath® software. Functionality for performing multipathing operations such as may be performed by EMC® PowerPath® software may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI driver 125b and a hardware (HW) driver 125c. The SCSI driver 125b may handle processing of a received I/O request from the MP driver 106 such as related to forming a request in accordance with the SCSI standard. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

The data storage system may provide a multi-tenant (MT) environment whereby multiple tenants store their data on the data storage system. In such an exemplary MT environment, a different service level objective or SLO may be specified for each tenant that defines a guaranteed performance level for the tenant. For example, an SLO may be related to a guaranteed level of performance with respect to I/O operations serviced at the data storage system for the tenant. In this case, the SLO specified for the tenant may be expressed in terms of one or more metrics, such as based on response time (RT). For example, the SLO specified for the tenant may include an average response time (RT) with respect to I/Os issued by the tenant. To further illustrate, an SLO may specify an average RT of 3 milliseconds (ms.) for the tenant whereby the tenant is guaranteed to have an average RT of 3 ms. for each LUN storing the tenant's data. The tenant may also be referred to as a consumer of the data storage system having its data stored on the data storage system. A single tenant or consumer may be, for example, one or more applications executing on a host. A single host may have one or more tenants or consumers where each of the tenants or consumers includes one or more applications. For simplicity of illustration, following examples may refer to a single application on a host as a tenant or consumer for which an SLO is specified where the SLO may be applied to each LUN used by the application. However, it will be appreciated by those skilled in the art that an SLO, such as RT, specified for a single tenant or consumer may be applied in the aggregate with respect to multiple applications and associated LUNs of the single tenant or consumer.

With existing implementations, the SLO specified may be guaranteed as measured on the data storage system. However, the customer or tenant may actually want the specified SLO to apply to the host or application perspective whereby the SLO RT is guaranteed as measured on the host-side or by the application issuing the I/Os. Thus, an embodiment in accordance with techniques herein may use an SLO that specifies, for example, a RT denoting a guaranteed level of performance as measured on the host.

It should be noted that the SLO may specify a RT denoting a guaranteed level of performance as measured on the host with respect to a metric other than average RT per LUN. For example, the SLO may specify multiple RTs for an application's LUNs. The application may be a database application and the SLO may specify a first RT to be guaranteed for each of the LUNs used as one of the application's log devices and a second RT to be guaranteed for each of the LUNs used as one of the application's data devices.

Additionally, although examples and illustrations herein may refer to a RT specified as an SLO, it should be noted that an SLO may be specified using one or more other metrics other than RT. For example, I/O related SLOs may be specified in terms of guaranteed I/O throughput (e.g., I/O rate such as I/Os per second), data throughput (e.g., megabytes per second), and the like. An SLO, such as the RT SLO described herein, may be applied on a per LUN level (e.g., guaranteed for each LUN individually). An embodiment may also specify an I/O related SLO such as RT which may be guaranteed at a different level of granularity than per LUN. For example, the RT SLO may be guaranteed as an aggregate average RT for the tenant or consumer and thus as an average RT determined with respect to I/Os issued to all LUNs of the tenant or consumer. As another variation where a tenant includes multiple applications, the RT SLO may be guaranteed at the application level (e.g., the RT SLO is guaranteed for each individual application of the tenant across all LUNs used by each individual application).

In an embodiment in accordance with techniques herein, the SLO specified may be guaranteed and measured from the host or application perspective. Thus, techniques described herein may be utilized to improve the overall accuracy of the RT SLO delivered where the RT measurements are made on the host and the RT specified as the SLO is guaranteed with respect to an average RT measured on the host. Described in following paragraphs are techniques that may be used in connection with detecting whether such an SLO, as measured on the host, is being met. If the SLO is not being met whereby the average RT exceeds the SLO specified RT, such an occurrence may also be referred to herein as an SLO violation. Responsive to an SLO violation, remediation processing may be performed to attempt to correct or improve the RT to facilitate improving and, if possible, eliminating the SLO violation. Generally, an SLO violation as measured on the host may be affected by one or more factors related to network performance, data storage system performance and host performance. Thus, techniques herein may additionally provide for analyzing and assessing various aspects of the environment such as related to the host, network, and data storage system in order to perform appropriate remediation measures.

An embodiment may define an SLO violation as described above where the measured performance is worse than as specified by the SLO metric. It should be noted that an embodiment may also more generally define an SLO violation as obtaining a first value for a performance metric, such as average RT, based on observed or measured performance values where the first value deviates more than a threshold amount from a specified SLO value for the performance metric. For example, the SLO may specify an average RT of 3 ms. An SLO violation may be determined if the average RT (as determined from observed RT values) deviates more than 0.5 ms. from the 3 ms. Thus, an SLO violation may be determined if the average RT based on such measured performance is outside of the RT range 3 ms.+/− 0.5 ms. or outside the inclusive range of 2.5 ms. through 3.5 ms. An embodiment may specify the deviation threshold amount, such as 0.5 ms, as a percentage of the specified SLO metric value 3 ms., or as a numeric quantity (e.g., real number). Thus, as described in more detail elsewhere herein, an SLO violation may also occur in some embodiments if the tenant's performance is better than as specified in the SLO.

In an embodiment in accordance with techniques herein, the host or component on the host, such as the MP driver, may obtain RT values, such as every 5 seconds, and report such RT values to an external analytics engine. The external analytics engine (also referred to herein as engine) may perform processing including receiving the reported RT values from the MP driver, calculating the average RT, determining whether there has been an SLO violation, and upon the occurrence of an SLO violation, performing remediation processing. The engine may calculate the average RT, such as with respect to some time period, based on values reported from the host. The engine may determine whether an SLO violation occurs by comparison between the calculated average RT and the SLO specified average RT, such as 3 ms. The engine may also perform other processing and calculations with respect to the data reported by the MP driver to determine resultant value(s) used in determining whether there is an SLO violation. For example, the engine may analyze the collected data over a time period to detect performance patterns (e.g., particular times of the day, week, or month where SLO violations occur), performance spikes, and the like, and then use such analysis in connection with a resultant value used for determining whether an SLO violation has occurred. For example, the average RT used in connection with determining whether there is an SLO violation may be calculated with respect to reported RT data collected over a time period such as a number of minutes, a number of hours, a number of days, and the like. Generally, the engine may perform any suitable calculations and processing using information based on RT values as reported by the MP driver to determine whether an SLO violation has occurred. For example, such processing performed by the engine in determining whether there is an SLO violation may take into account one or more factors such as a frequency or amount of time a reported RT value from the host does not meet an RT limit specified in the SLO.

How aggressive the engine is at determining SLO violations may vary with embodiment. An embodiment may select any suitable time period over which the average RT is calculated and may also select any suitable frequency at which to determine whether an SLO violation has occurred.

In one embodiment, the engine may perform one or more types of remediation processing such as related to the network, data storage system and/or host. The one or more particular types of remediation processing performed responsive to a particular SLO violation at a point in time may vary with existing conditions or phenomena of the network, data storage system and/or host. At a point in time when the SLO violation occurs, the engine may make an assessment or determination regarding a probable cause of the SLO violation as one related to the network, the data storage system, or the host. Such a determination or assessment may be made to try and correlate the particular SLO violation at a point in time with existing conditions or phenomena of the network, data storage system and/or host. Such an assessment may be performed in order to identify the particular type of remediation action (e.g., with respect to the network, data storage system, or host) to perform that is likely to positively impact and improve the measured RT to achieve the SLO RT.

It should be noted that an SLO violation may be correlated with existing conditions or phenomena of the network, for example, to determine whether there exists a network problem or conditions at the same time the SLO violation has occurred and whether the detected network problem or conditions are determined as related to the SLO violation (e.g., may likely cause or impact the SLO violation). Similarly, correlations may be made between the SLO violation and other existing conditions or phenomena of the data storage system or host. In this manner, as described in more detail below, the engine may generally receive data from the network, host and data storage system for use in making such an assessment regarding correlation between the SLO violation and existing conditions or phenomena.

Figure 5:
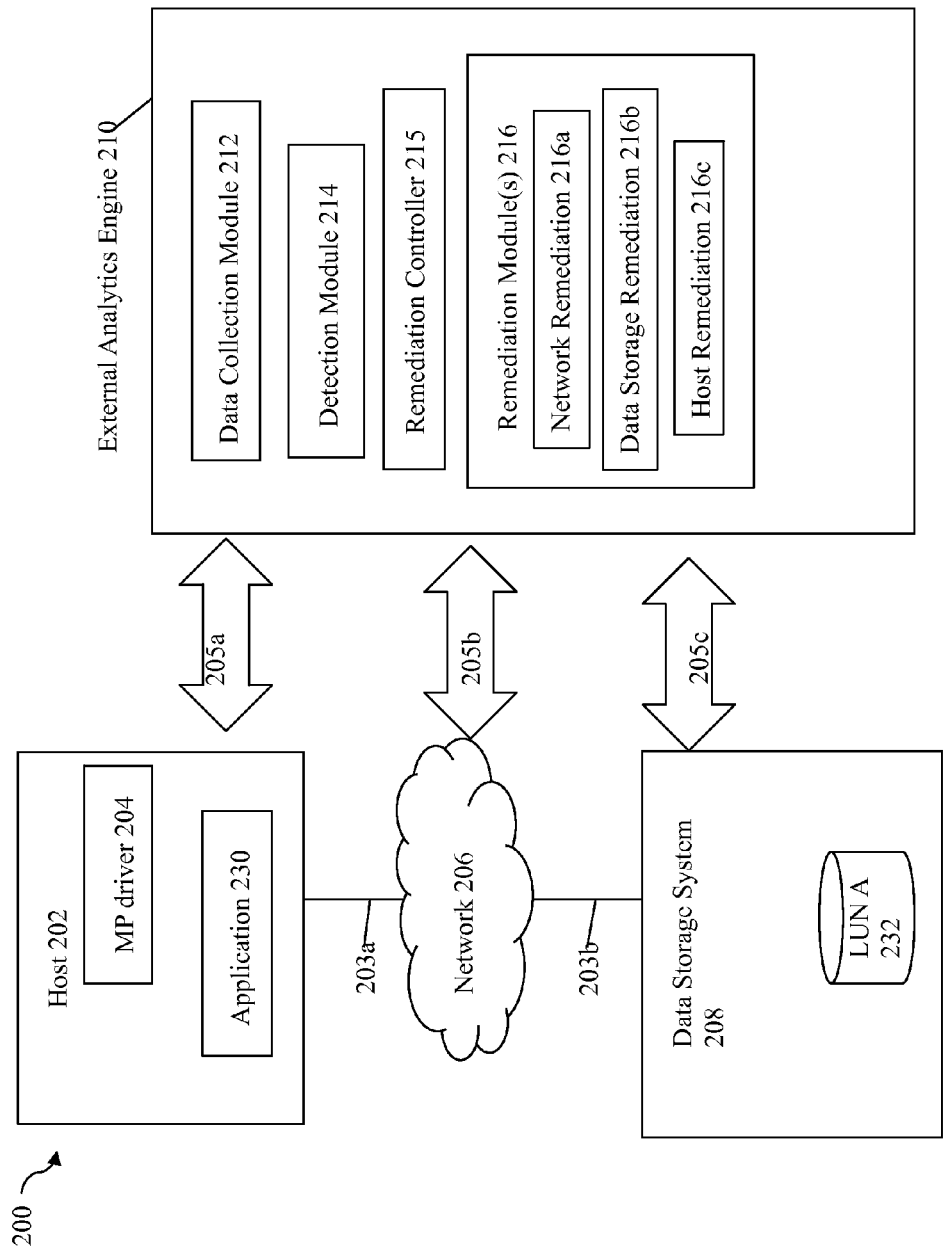
FIG. 5 is an example of components that may be included in a system and network in an embodiment in accordance with techniques herein.

Referring to FIG. 5, shown is an example of components that may be included in an embodiment using techniques herein. The example 200 includes host 202, MP driver 204, network 206, data storage system 208 and external analytics engine 210. The host 202 and data storage system 208 may be as described elsewhere herein with details omitted for simplicity of illustration. The network 206 may be a generalization of the switch 140 of FIG. 3 or other components used to provide a network or other connection between the host 202 and data storage system 208. Element 203a may represent the one or more connections between the host 202 and the network 206. Element 203b may represent the one or more connections between the network 206 and the data storage system 208. The data path over which I/Os may be sent from the host to the data storage system 208 may be 203a, 206, 203b. In this example, the host 202 may include application 230 that is a tenant of the data storage system 208. The application 230 may have its data stored on LUN A 232 of the data storage system 208 and issues I/O to LUN A 232 over the foregoing data path.

The external analytics engine 210 may include a data collection module 212, a detection module 214, a remediation controller module 215, and one or more remediation modules 216. Elements 205a, 205b and 205c may, respectively, represent the management and control paths over which information is communicated between the host 202, network 206, data storage system 208 and the external analytics engine 210. The external analytics engine 210 may generally perform processing as described above and elsewhere herein. In this example 200, shown are different functional modules that may be included in one embodiment of the engine 210. It should be noted that, more generally, an embodiment may include any suitable number of modules in 210 and may partition the processing and functionality performed and described herein among such modules in any suitable manner.

In this illustrative embodiment of 200, the data collection module 212 may generally collect the various types of data provided to the engine 210. For example, the MP driver 204 may report RT values with respect to I/Os issued by the application 230 to the LUN A 232. It should be noted that each of the RT values reported by the host, such as every 5 seconds, may itself be an average RT value based on individual, per I/O, RT measurements observed at the host during that particular 5 second time period. In at least one embodiment, the MP driver 204 may report the average RT based individual I/O RTs observed at the host during the 5 second time period (as just mentioned) and may also report additional information including the minimum and maximum single observed RT (for a single I/O) during the time period, and a distribution regarding the quantity of single observed RT values that fall into various RT ranges. Although examples are provided herein where an average RT value (based on RT values from the host) is used in determining whether there is an SLO violation, an embodiment may also use such additional information as just mentioned, as well as other suitable information, in determining whether there is an SLO violation.

The RT values from the host 202 may be reported by the MP driver 204 to the engine 210 over 205a where the reported RT values are received, processed and stored by the data collection module 212. The data collection module 212 may calculate the average RT for the LUN A 232 from such reported RT values. The data collection module 212 may provide the calculated average RT for LUN A 232 to the detection module 214. Generally, the detection module 214 may determine whether there has been an SLO violation, such with respect to the calculated average RT for LUN A 232. If so, the detection module 214 may communicate with the remediation controller 215 to control remediation processing. The remediation controller 215 may generally control remediation processing and determine what types of remediation actions are performed. The remediation controller 215 may try to correlate the current SLO violation to existing conditions or phenomena of the network, data storage system and/or host. Such an assessment may be performed in order to identify the particular type of remediation action (e.g., with respect to the network, data storage system, or host) to perform that is likely to positively impact and improve the measured RT of LUN A 232 to achieve the SLO RT for the LUN A 232. For example, if the SLO violation can be correlated to network related conditions or phenomena, the remediation controller 215 may invoke the network remediation module 216a to perform a network remediation action to try and reduce the measured RT. If the SLO violation cannot be correlated to network related conditions or phenomena and can be correlated to data storage system related conditions or phenomena, the remediation controller 215 may invoke the data storage system remediation module 216b to perform a data storage system remediation action to try and reduce the measured RT. If the SLO violation cannot be correlated to data storage system related conditions or phenomena, the remediation controller 215 may invoke the host remediation module 216c to perform a host remediation action to try and reduce the measured RT for LUN A 232. The foregoing is described in more detail in following paragraphs.

The data collection module 212 may generally receive different types of reported statistics from the host 202 (over connection 205a), from the network 206 (over connection 205b) and from the data storage system 208 (over connection 205c). Such reported information from the network 206, data storage system 208, and host 202 may be used to try and correlate an SLO violation at a particular point in time, respectively, to network connectivity related conditions or phenomena (e.g., network congestion), data storage system related conditions or phenomena, or host related conditions or phenomena. Such reporting of information from the host 202, network 206 and data storage system 208 may be performed at any suitable time period, such as every 5 seconds. Additionally, as described elsewhere herein, such statistics reported may also be used in connection with selection of a particular action. For example, the engine 210 may periodically receive from the network 206 different statistics regarding network performance, workload, and the like. The engine 210 may periodically receive from the data storage system 208 different statistics regarding data storage system performance, workload, and the like. The engine 210 may periodically receive from the host 202 different statistics regarding host or application performance, workload, and the like (including the RT values as described above). In this manner, the remediation controller 215 of the engine 210 may use such data to make an assessment regarding which remediation module of 216 to invoke to perform a particular type (e.g., network related, data storage system related, or host-related) of remediation action. For example, an SLO violation may occur at a first point in time for LUN A 232. At the first point in time, network reported information does not indicate any network problems such as, for example, inoperable network components or congestion with workloads more than expected levels. However, the data storage system reported information may also indicate a higher than expected average RT for the LUN A 232. The data storage system may report average RT values for the LUN A 232 as measured on the data storage system (e.g. where the data storage system's average RT is measured with respect to when I/Os are received on the data storage system and when responses to the I/Os are sent from the data storage system without including the network-related time over the data path). In this case, the data storage remediation module 216b may be invoked to perform a remediation action such as to allocate one or more additional data storage system resources for use in servicing I/Os for the LUN A 232 experiencing the SLO violation. As another example, an SLO violation may occur at a second point in time for another LUN (not illustrated) LUN B. At the second point in time, network reported information may indicate network congestion with workloads higher than expected levels on particular paths over which LUN B sends its I/Os to the data storage system. In this case, the network remediation module 216a may be invoked to perform a remediation action.

It should be noted that in the particular arrangement of modules described in the example 200, the detection module 214, the remediation controller 215 and/or remediation modules of 216 may communicate with the general data collection module 212 to obtain any needed statistics to perform processing as described herein.

The data storage system 208 may communicate directly, such as over management and control path 205c, with the engine 210 as illustrated when reporting the data storage system statistics. Alternatively, the data storage system 208 may communicate such information to the engine 210 indirectly such as via the host 202 and MP driver 204 over the data path (e.g., 203b, 206 203a). In turn, the MP driver 204 or host 202 may then transfer the data storage system statistics to the engine 210 over the management and control path 205a.

As an example of a network remediation, the data storage system may report a 1 ms. average RT for LUN A (based on RT measurements observed at the data storage system) thereby not indicating any performance related RT problems on the data storage system for LUN A. Based on host-provided data, the average RT for LUN A may be 4 ms. as measured on the host. The engine may perform processing using coded logic that determines the difference in measured RT of 4 ms. (e.g., at the host)–1 ms. (e.g., at the data storage system). The engine may also determine that the 3 ms. RT difference is due to the network (e.g., correlated to network related conditions and phenomena) and may perform a network remediation action. For example, the engine may be configured to execute a set of predetermined network changes to try and address the SLO violation.

As another example, an SLO violation for LUN A may occur. Network reported statistics may indicate a heavy workload on the path used by the host to issue I/Os to the LUN A. Additionally, other reported information such as provided by the host may indicate that the same path is used to perform a backup scheduled at the same time the SLO violation has occurred. In this case, the engine may determine that the SLO violation can be correlated to network related conditions and phenomena and may select one action from possibly multiple candidate actions to alleviate or remove the SLO violations. Such candidate actions from which one is selected may include, for example, changing the path used by the host to issue I/Os to the LUN, and increasing the available resources on the path simultaneously used for both the backup traffic and to issue I/Os to the LUN (e.g., such as by increasing available bandwidth on the path used).

The engine may record one or more previous actions taken to alleviate prior SLO violations (e.g., the last or most recent one or more actions taken to alleviate SLO violations) and may consider such prior remediation actions taken as a factor in connection with determining which action to next take upon the occurrence of a further SLO violation such as for the same LUN. For example, at a first point time a first SLO violation for LUN A may occur and a first network remediation action may be performed. At a second point in time, a second SLO violation for LUN A may occur a second network remediation action may be performed. At a third point in time, a third SLO violation for LUN A may occur. In response to this third SLO violation for LUN A, the controller may alternatively perform a different type of remediation action other than a network remediation action. For example, the controller may invoke either module 216b to perform a data storage system remediation action or module 216c to perform a host remediation action.

As another example, consider the following where an action is selected that is a data storage system remediation action. In this example, a host side average RT SLO for a LUN may be 3 ms, the average RT for the LUN, as measured host-side, may be 4 ms. (as calculated by the engine), the average RT for the LUN, as measured at the data storage system-side, may be 3 ms. thereby indicating that an additional average of 1 ms. RT is added due to the network. Rather than perform a network remediation action, a data storage system remediation action may be taken. For example, the data storage system remediation action selected may be for the engine to instruct the data storage system to take steps to decrease the average RT for the LUN at the data storage system to be no more than 1.5 ms. The data storage system may respond by allocating additional data storage system resources for use in servicing the LUN's I/Os. For example, the data storage system may dedicate one or more of additional processors of an HA, one or more additional processors of a DA, additional CPU time, additional I/O throughput (e.g., more I/Os per second), additional data bandwidth (e.g. more megabytses/second), additional cache, additional target ports or HAs (e.g., make the LUN available over more paths and target ports), and the like, for use in servicing the LUN's I/Os. Other possible data storage system actions may include configuration options such as moving the LUN's data from a first physical storage device to a second physical storage device having higher performance characteristics than the first physical device. For example, the LUN's data may be relocated from a SATA rotating disk drive to a flash or solid state drive. In this manner, the engine may be enabled to request the data storage system to provide RT improvements even if the network remains congested.

As another example of a host remediation with reference to FIG. 5, there may be a second host (not illustrated) connected to the same data storage system 208 (such as through another switch) as the first host 202. An SLO violation may occur for the application 230 on the host 202. Processing performed may be unable to correlate the current SLO violation to any of network-related conditions or phenomena and data storage system-related conditions or phenomena. As such, a decision may be made by the engine to perform a host remediation action. In this example, the selected remediation action may be to relocate the application 230 of the first host 202 issuing I/Os to the LUN having the violation to the other above-noted second host determined to have sufficient available data bandwidth for sending I/Os. For example, the second host may not have any SLO violations. For the second host, the engine may determine the consumed data bandwidth at each initiator port of the second host and determine the aggregate amount of data bandwidth (e.g., average megabytes/second) remaining or available to thereby provide an estimation of the aggregated available data bandwidth of the second host. Data may be collected to provide an estimate of the data bandwidth consumed by the application 230 of the first host 202 when issuing I/Os directed to the LUN. In this manner, a determination may be made as to whether the second host has sufficient resources available to accommodate the additional I/O workload of the application if the application is relocated to the second host.

An embodiment may have multiple RTs (or more generally multiple values for the same or different metrics) included in an SLO defined for the application 230. For example, a first RT may be included in an SLO for an application where the first RT is for read I/Os directed to the LUN A 232. The SLO for the application may also include a second RT specified for write I/Os directed to the LUN A 232. The foregoing I/O specific SLOs may be specified alone, or in combination with, an aggregate RT SLO for all I/Os (e.g., RT SLO as described above determined with respect to both reads and writes in the aggregate directed to the LUN). In this case, RT values observed by the host for the LUN as reported to the engine may include a first reported value that is an average RT for read operations directed to the LUN and a second reported value that is an average RT for write operations directed to the LUN. A remediation action selected, such as the particular data storage system remediation action selected, may vary with the mix of read and write operations and/or with the particular SLO (read or write) violated. For example, there may be a write SLO violation but not a read SLO violation. In this case, a data storage system remediation action may be selected that focuses primarily on writes (e.g., rather than reads or on the aggregate of reads and writes). For example, additional data storage resources may be allocated with a focus on write operations, such as allocating additional data cache for storing write pending data. It should be noted that the data storage system may report information to the engine related to workload, performance and resource consumption such as, for example measured RT on the data storage system for I/Os issued to a LUN, an amount (e.g., average) of cache consumed for storing pending writes for the LUN, workload of one or more DAs servicing I/Os for the LUN, and the like.

In a multi-tenant environment using techniques herein, the particular action selected may also consider the expected impact on one or more other tenants. In this manner, the set of potential actions that may be taken may be reduced due to undesirable adverse impact on other tenants. For example, a first candidate remediation action may increase the amount of resources available for a first tenant in order to improve the first tenant's average RT. However, in order to increase the amount of resources for the first tenant, the amount of the same resources may be decreased for a second tenant whereby the average RT for second tenant is expected to increase. Based on the foregoing, the first candidate remediation action may not be selected since any increase in the second tenant's average RT would trigger an SLO violation for the second tenant.

As another aspect mentioned above, an embodiment may determine an SLO violation has occurred if the average RT is also too low. For example, an SLO violation may be determined if the average RT, as determined based on one or more measured RT values, is not within the range 3.0 ms+/−0.4 ms. An SLO violation may be determined if the average RT is 1 ms. In this case in a multi-tenant environment, a remediation action may be performed to purposely increase the measured RT to be within the foregoing allowable range and thereby prevent the tenant from overconsuming available resources. In other words, techniques herein may also be applied to throttle down or reduce the amount of resources available for use by a tenant thereby purposefully increasing the average RT as measured from the host or, generally, network location where the tenant is located.

It should be noted that in one embodiment described herein, the different types of possible remediation may be assessed in a prioritized order such as network, data storage and then host. In such an embodiment, if it is determined not to perform a network or data storage system remediation, the host remediation processing may always be performed by default as a "last resort". In this case, there may be no determination as to whether to generally perform host remediation since host remediation processing may always be performed as a final default option.

In some embodiments, the system and network may be configured so that the engine may communicate with the network, data storage system, and/or host to automatically implement a selected remediation action. For example, the engine may be configured to execute a predetermined network change of a selected network remediation action. For example, such a remediation action may include modifying one or more network parameters. In this case, the engine may communicate and set the predetermined modified network parameter values in the network. In a similar manner and as described elsewhere herein as an exemplary data storage system remediation action, the engine may communicate new settings or values to the data storage system. It should be noted that such information may be communicated from the engine to the data storage system directly over 205c or indirectly, such as over 205a to the host/MP driver. The host may subsequently communicate the new settings or values to the data storage system such as parameters of a command sent from the host to the data storage system.

Determining whether to perform a particular type (e.g., network, data storage system, host) of remediation processing may be performed, more generally, in accordance with first one or more criteria. Examples of such first criteria are described herein. For example, the first criteria may include information indicating current conditions or phenomena of the network, data storage system and/or host. The first criteria may also include, for example, one or more previous remediation actions taken in connection with one or more previous SLO violations. Such first criteria may be used to determine whether to perform a particular type of remediation. Additionally, selecting an action of the particular type to take may also more generally be performed, more generally, in accordance with one or more action selection criteria. Some examples of action selection criteria are described herein. For example, the action selection criteria may include any of a type of I/O operation (e.g., read or write) associated with the current SLO violation, an expected impact on one or more tenants of implementing a particular action on behalf of another first tenant, data regarding any of workload, performance and resource consumption, and the like.

It should be noted the action selection criteria may include some, all, or none of the same items of the first criteria noted above (e.g., some of the same criteria may be used and applied in connection with both determining whether to perform a particular type (e.g., network, data storage system, host) of remediation processing and also selecting a particular action). For example, one or more previously selected actions may be included in both the first criteria and also in the action selection criteria.

Figure 6:
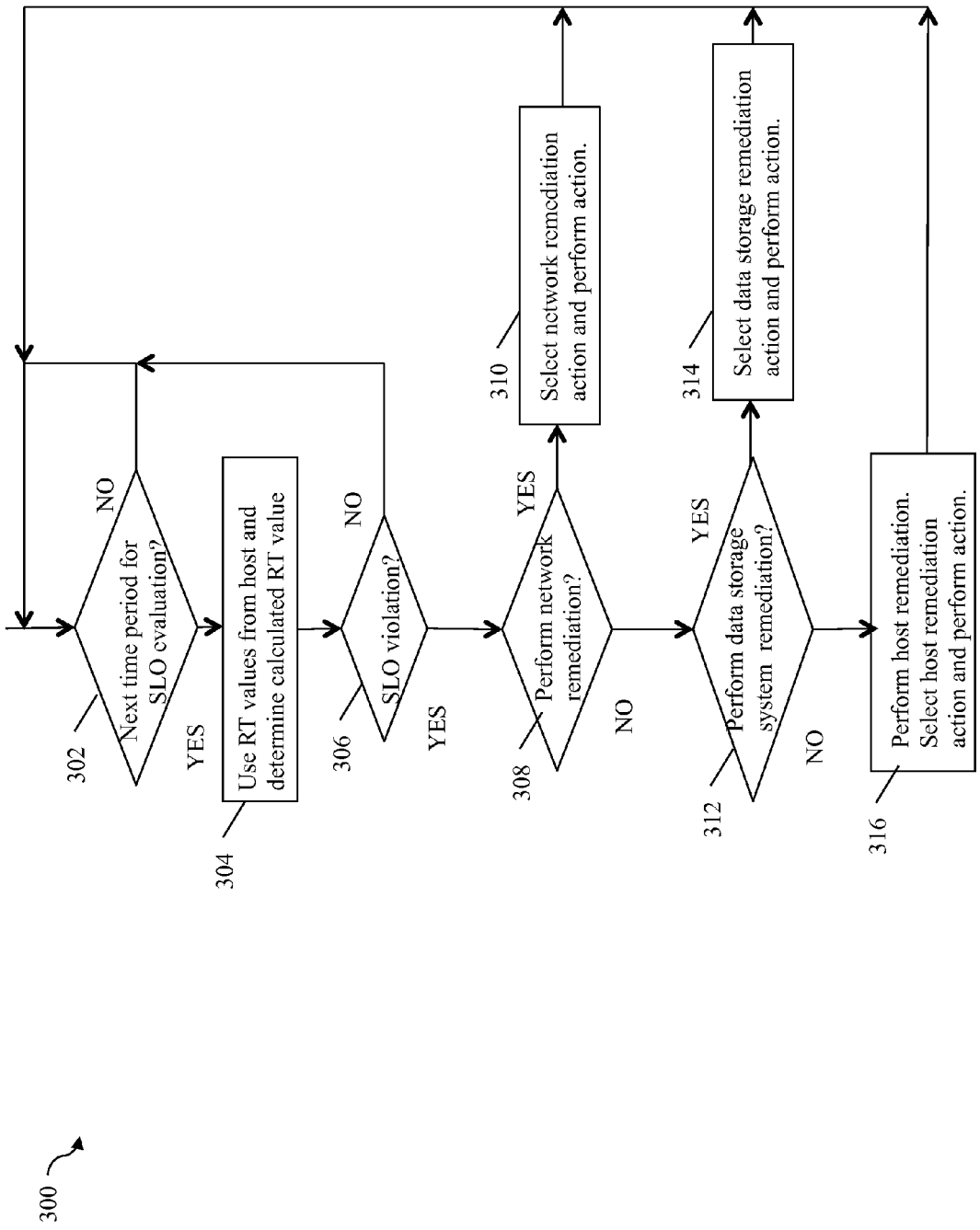
FIGS. 6-8 are flowcharts of processing steps that may be performed in an embodiment in accordance with techniques herein.

Referring to FIG. 6, shown is a flowchart of processing steps that may be performed in an embodiment in accordance with techniques herein. The flowchart 300 summarizes processing as described above that may be performed in an embodiment in accordance with techniques herein. At step 302, a determination is made as to whether the next time period has arrived for performing an SLO evaluation whereby a determination is made as to whether there is an SLO violation. Control returns to step 302 until the next time period arrives causing step 302 to evaluate to yes. At step 304, the engine calculates an RT value, such as an average RT, using the RT values reported by the host. At step 306, a determination is made as to whether an SLO violation has occurred. Step 306 may include comparing the RT value calculated in step 304 to another RT value (or associated RT value range) as specified in an SLO. As described herein, an embodiment may use an SLO that specifies multiple values for multiple guaranteed limits or ranges. For example, as described herein, an SLO may include a first RT value for write operations and a second RT value for read operations. In this case, an SLO violation may be determined to occur if there is a violation with respect to any one or more of the first RT value and the second RT value. If step 306 evaluates to no indicating no SLO violation, control returns to step 302. If step 306 evaluates to yes indicating an occurrence of an SLO violation, control proceeds to step 308.

At step 308, a determination is made as to whether to perform network remediation. Step 308 may be performed in accordance with a first set of one or more criteria as described herein. For example, the one or more criteria may include determining whether the SLO violation may be correlated with existing conditions or phenomena of the network, for example, to determine whether there exists a network problem or conditions at the same time the SLO violation has occurred and whether the detected network problem or conditions are determined as related to the SLO violation (e.g., may likely cause or impact the SLO violation). The criteria may also include, for example, one or more previous remediation actions taken in connection with one or more previous SLO violations. For example, if this is the third sequential SLO violation for the same LUN and the two previous remediation actions were network related, step 308 may evaluate to no in light of such criteria whereby an alternative type of remediation action other than network related is performed for the current third SLO violation. The foregoing and other exemplary criteria that may be used in an embodiment are described elsewhere herein. If step 308 evaluates to yes, control proceeds to step 310 to select a network remediation action and perform the selected action. It should be noted that, as described elsewhere herein, the particular remediation action selected in step 310 may use various statistics and information as reported to the engine, for example, by the network. More generally, selection of the particular action in step 310 may be in accordance with action selection criteria. From step 310, control proceeds to step 302. If step 308 evaluates to no, control proceeds to step 312.

At step 312, a determination is made as to whether to perform data storage remediation. Step 312 may be performed in accordance with the first set of one or more criteria as described herein. For example, the criteria used in step 312 may include determining whether the SLO violation may be correlated with existing conditions or phenomena of the data storage system, for example, to determine whether there exists a data storage system problem or conditions at the same time the SLO violation has occurred and whether the detected data storage system problem or conditions are determined as related to the SLO violation (e.g., may likely cause or impact the SLO violation). The criteria used in step 312 may also include, for example, one or more previous remediation actions taken in connection with one or more previous SLO violations. For example, if this is the third sequential SLO violation for the same LUN and the two previous remediation actions were data storage system related, step 312 may evaluate to no in light of such criteria whereby an alternative type of remediation action other than data storage system related is performed for the current third SLO violation.

If step 312 evaluates to yes, control proceeds to step 314 to select and perform a data storage system remediation action. It should be noted that, as described elsewhere herein, the particular remediation action selected in step 314 may use various statistics and information as reported to the engine, for example, by the data storage system. More generally, selection of the particular action in step 314 may be in accordance with action selection criteria. For example, as described herein, an embodiment may track and use a first SLO RT for read operations and a second SLO RT for write operations and, for example, there may be an SLO violation of only the second SLO for write operations. The particular data storage system action selected may use information such as whether the SLO violation is a read or write SLO violation as well as workload and performance information reported by the data storage system to the engine such as, for example, information regarding the workload profile or mix of reads and writes (e.g., 90% writes and 10% reads). In such a case, the remediation action selected may be more customized for writes due to the current conditions and workload. From step 314, control proceeds to step 302. If step 312 evaluates to no, control proceeds to step 316.

At step 316, host remediation may be performed. Step 316 may include selecting and performing a host remediation action. As described above, the particular remediation action selected in step 316 may use various statistics and information as reported to the engine. More generally, selection of the particular action in step 316 may be in accordance with action selection criteria.

Figure 7:
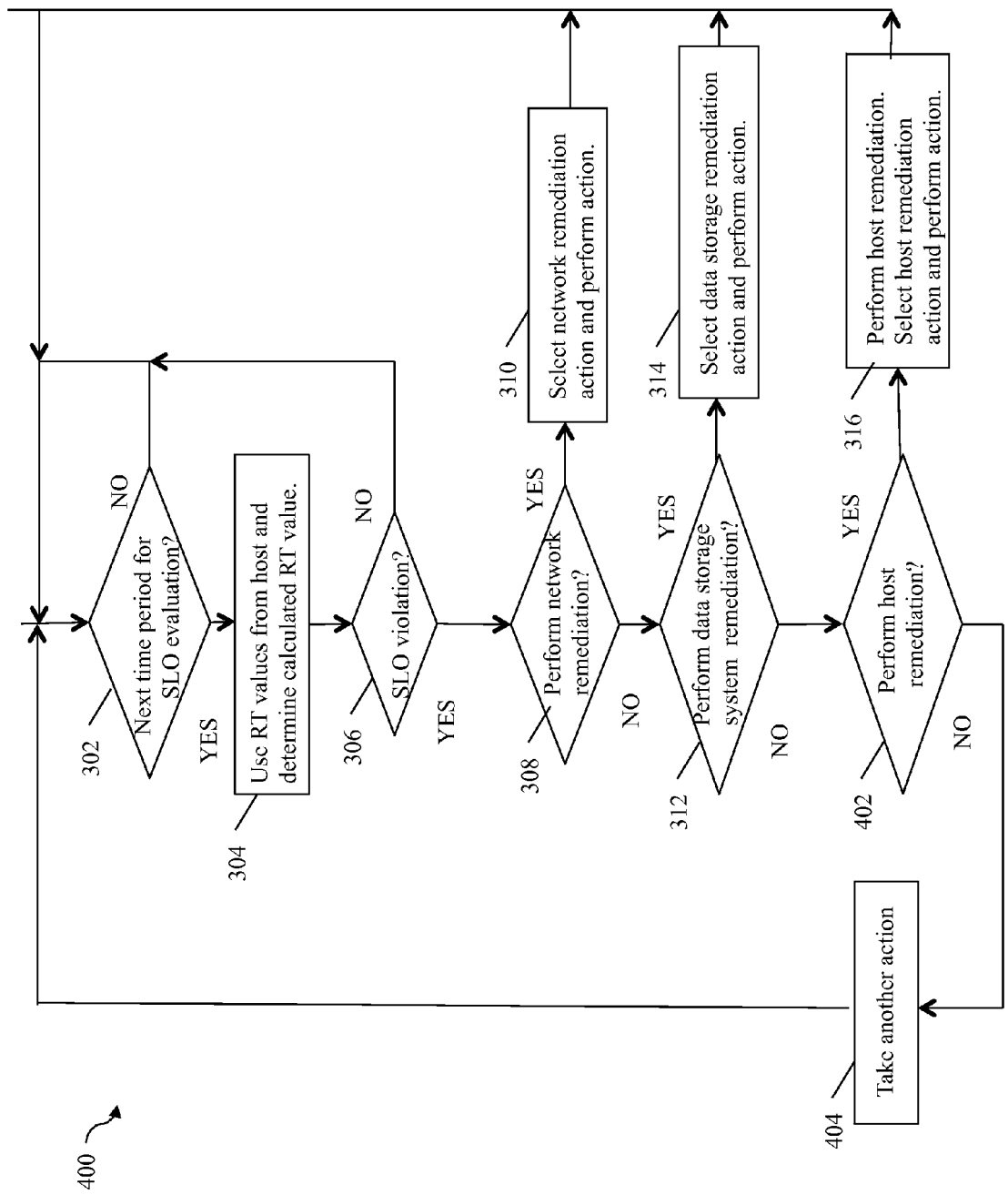

Referring to FIG. 7, shown is another flowchart of processing steps that may be performed in an embodiment in accordance with techniques herein. The flowchart 400 summarizes processing as described above that may be performed in an embodiment in accordance with techniques herein. The flowchart 400 is the same as flowchart 300 with the difference of new steps 402 and 404. Generally, flowchart 300 processing noted above may automatically always perform a host remediation action as a default. Alternatively, in the flowchart 400, a determination is made as step 402 as to whether to perform host remediation. Step 402 may be performed in accordance with the first one or more criteria as mentioned elsewhere herein. Step 402 may include, for example, determining whether the SLO violation may be correlated with existing conditions or phenomena of the host.

If step 402 evaluates to yes, step 316 is performed. If step 402 evaluates to no, control proceeds to step 404 to take another action. Step 404 may be that no remediation action is performed such as if no further remediation actions are available. Step 404 may include reporting to a customer, user, and/or data storage system administrator, regarding the current SLO violation and the fact that no remediation actions are available. From step 404, control may return to step 302.

Figure 8:
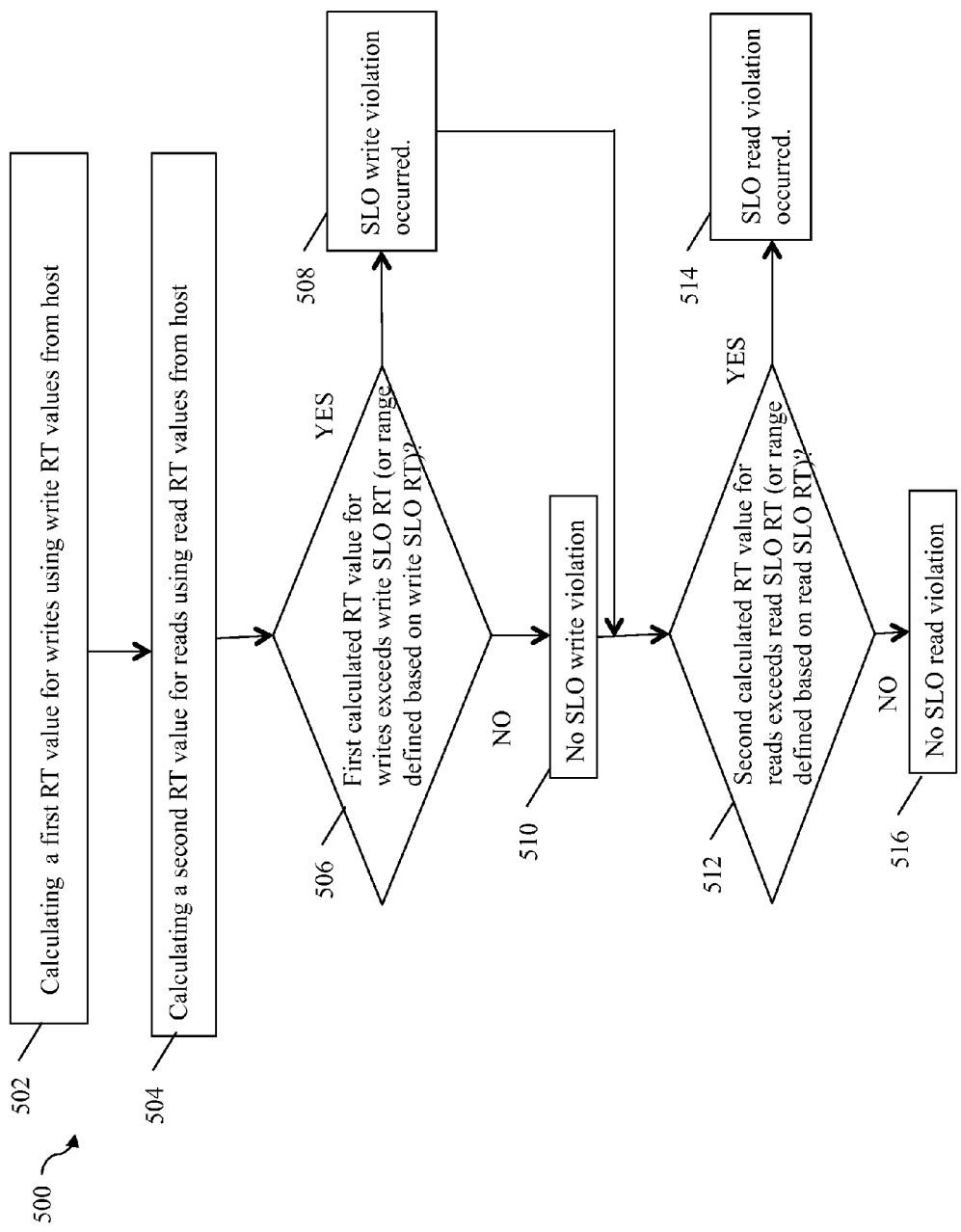

Referring to FIG. 8, shown is a flowchart of processing steps that may be performed in an embodiment in accordance with techniques herein in connection with determining whether there is SLO violation. The flowchart 500 provides additional detail regarding processing that may be performed in steps 304 and 306 in an embodiment in which the SLO specifies a first RT value for reads and a second RT value for writes. As described elsewhere herein, each value may specify a guaranteed performance level or range based on the value. In step 502, a first calculated RT value for writes may be determined using write RT values from the host. In step 504, a second calculated RT value for reads may be determined using read RT values from the host. In step 506, a determination is made as to whether the first calculated RT value for write exceeds the write SLO RT. Alternatively, in an embodiment in which the write SLO RT is used to define a range of RT values, step 506 determines whether the first calculated RT value for write is outside of the range of RT values defined based on the write SLO RT. If step 506 evaluates to yes, control proceeds to step 508 where it is determined that a write SLO violation has occurred. From step 508 control proceeds to step 512. If step 506 evaluates to no, control proceeds to step 510 where it is determined that no SLO write violation has occurred and control proceeds to step 512.

At step 512, a determination is made as to whether the second calculated RT value for reads exceeds the reads SLO RT. Alternatively, in an embodiment in which the read SLO RT is used to define a range of RT values, step 512 determines whether the second calculated RT value for reads is outside of the range of RT values defined based on the read SLO RT. If step 512 evaluates to yes, control proceeds to step 514 where it is determined that a read SLO violation has occurred. If step 512 evaluates to no, control proceeds to step 516 where it is determined that no SLO read violation has occurred.

In one embodiment, step 306 (of FIGS. 6 and 7) evaluates to yes if any of steps 508 and 514 is performed.

It should be noted that exemplary embodiments described herein may use performance measurements, such as response times, that are measured host-side (e.g., obtained by host 202 for application 230 and reported to engine 210) and may also use an SLO specifying a response time guaranteed as measured at the host (where the tenant is located). However, more generally, rather than use performance measurements obtained at the host, techniques herein may use information reported from other locations, such as from the data storage system and network. For example, rather than use RT values based on performance measurements obtained at the host, an embodiment in accordance with techniques herein may indirectly calculate a first value that may estimate or approximate the current host-side RT performance. The first value may be calculated indirectly from any of measurements, statistics, and the like, as reported to the engine from the data storage system and the network. The first value (estimating the current host-side performance) may be compared to a guaranteed performance level specified in an SLO to determine whether there is an SLO violation. It should be noted that techniques herein may also calculate the first value based on information reported to the engine from the data storage system and network, alone or in combination with information reported from the host.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of achieving service level objectives comprising:
   receiving a first service level objective for a first tenant of a data storage system whereby the first tenant has data stored in a first set of one or more devices of the data storage system, said first service level objective including a first value for a first metric, wherein said first tenant is located on a first host and issues I/O operations directed to the first set of one or more devices of the data storage system, wherein the first service level objective denotes a guaranteed level of performance for the first tenant as measured on the first host and the first metric is a performance metric with respect to I/O operations issued by the first tenant;
   determining a first calculated value for the first metric using one or more measured values obtained at the first host;
   determining, using the first calculated value for the first metric, whether the first service level objective for the first tenant is violated; and
   responsive to determining that the first service level objective for the first tenant is violated, performing first processing that selects a first remediation action, said first processing comprising:
      determining, in accordance with one or more criteria, whether to perform network remediation; and
      if it is determined to perform network remediation, performing second processing including:
         selecting a network remediation action as the first remediation action; and
         performing the network remediation action as the first remediation action.

2. The method of claim 1, wherein the first metric is any of a response time, a data throughput rate, an I/O throughput rate.

3. The method of claim 1, wherein the first tenant includes one or more applications executing on the first host that issue I/O operations directed to the first set of one or more devices of the data storage system.

4. The method of claim 1, wherein determining whether the first service level objective for the first tenant is violated includes determining whether the first calculated value for the first metric is greater than the first value for the first metric, and wherein a violation of the first service level objective is determined when the first calculated value for the metric is greater than the first value of the first metric.

5. The method of claim 1, wherein determining whether the first service level objective for the first tenant is violated includes determining whether the first calculated value for the first metric is within a range of values having a lower bound and an upper bound, the lower bound being the result of the first value minus a threshold amount and the upper bound being a result of the threshold amount added to the first value, and wherein a violation of the first service level objective is determined when the first calculated value for the metric is not within the range of values.

6. The method of claim 1, wherein, if it is determined not to perform network remediation, performing third processing including:
   determining, in accordance with one or more criteria, whether to perform data storage system remediation; and
   if it is determined to perform data storage remediation, performing third processing including:
      selecting a data storage system remediation action; and
      performing the data storage system remediation action.

7. The method of claim 6, wherein, if it is determined not to perform data storage system remediation, performing fourth processing including:
   selecting a host remediation action; and
   performing the host remediation action.

8. The method of claim 1, wherein the first service level objective for the first tenant includes a second value for the first metric, wherein the first calculated value for the first metric is calculated using one or more measured values that are associated with write operations issued from the first host, the first value for the first metric is applied in connection with guaranteeing a performance level associated with write operations, and the second value for the first metric is applied in connection with guaranteeing a performance level associated with read operations.

9. A method of achieving service level objectives comprising:
   receiving a first service level objective for a first tenant of a data storage system whereby the first tenant has data stored in a first set of one or more devices of the data storage system, said first service level objective including a first value for a first metric, wherein said first tenant is located on a first host and issues 110 operations directed to the first set of one or more devices of the data storage system;
   determining a first calculated value for the first metric using one or more measured values obtained at the first host;
   determining, using the first calculated value for the first metric, whether the first service level objective for the first tenant is violated; and
   responsive to determining that the first service level objective for the first tenant is violated, performing first processing that selects a first remediation action, wherein the first service level objective for the first tenant includes a second value for the first metric, wherein the first calculated value for the first metric is calculated using one or more measured values that are associated with write operations issued from the first host, the first value for the first metric is applied in connection with guaranteeing a performance level associated with write operations, and the second value for the first metric is applied in connection with guaranteeing a performance level associated with read operations, and wherein the method includes:
      determining a second calculated value for the first metric using one or more measured values that are associated with read operations and obtained at the first host; and
      wherein determining whether the first service level objective for the first tenant is violated further includes:
         comparing the first calculated value for the first metric to any of the first value for the first metric and a first range of values, the first range of values having a first lower bound and a first upper bound, the first lower bound being the result of the first value minus a first threshold amount and the first upper bound being a result of the first threshold amount added to the first value; and comparing the second calculated value for the first metric to any of the second value for the first metric and a second range of values, the second range of values having a second lower bound and a second upper bound, the second lower bound being the result of the second value minus a second threshold amount and the second upper bound being a result of the second threshold amount added to the second value.

10. The method of claim 9, wherein said determining whether the first service level objective for the first tenant is violated is based on said comparing the first calculated value for the first metric to any of the first value for the first metric and the first range of values and said comparing the second calculated value for the first metric to any of the second value for the first metric and the second range of values.

11. The method of claim 1, wherein said first processing includes:
selecting a first type of remediation in accordance with a set of one or more criteria including any of correlating a current service level objective violation with conditions or phenomena of the network, data storage system and/or host, a remediation action type of one or more previous remediation actions taken in connection with one or more previous service level objective violations; and
selecting the first remediation action of the first type of remediation in accordance with one or more action selection criteria including any of a type of I/O operation associated with the current service level objective violation, data regarding any of workload, performance and resource consumption, and expected impact, due to implementing a candidate action, on one or more other tenants that issue I/O operations to the data storage system.

12. The method of claim 1, wherein the first tenant is one of a plurality of tenants having data stored on the data storage system, wherein the plurality of tenants includes a second tenant and wherein a second service level objective is defined for the second tenant.

13. The method of claim 5, wherein the first metric is response time and the method further comprises:
determining that the first service level objective for the first tenant is violated, wherein the first calculated value for the first metric is lower than the lower bound of the range, and wherein the first remediation action includes reducing an amount of at least one resource used by the first tenant, wherein the at least one resource is a resource from any of the first host, a network and the data storage system.

14. The method of claim 1, wherein the first value for the first metric indicates a guaranteed level of performance for any of an application of the first tenant, each single device of the first set of the first tenant, as an aggregate with respect to the first set of one or more devices, and as an aggregate with respect to multiple applications of the first tenant.

15. A data storage system comprising:
one or more processors;
one or more physical storage devices wherein storage is provisioned from the one or more physical storage devices for a first set of one or more logical devices;
a memory comprising code stored therein that, when executed by a processor, performs a method comprising:
receiving a first service level objective for a first tenant of a data storage system whereby the first tenant has data stored in the first set of one or more logical devices, said first service level objective including a first value for a first metric, wherein said first tenant is located on a first host and issues I/O operations directed to the first set of one or more logical devices of the data storage system, wherein the first service level objective denotes a guaranteed level of performance for the first tenant as measured on the first host and the first metric is a performance metric with respect to I/O operations issued by the first tenant;
determining a first calculated value for the first metric using one or more measured values obtained at the first host;
determining, using the first calculated value for the first metric, whether the first service level objective for the first tenant is violated; and
responsive to determining that the first service level objective for the first tenant is violated, performing first processing that selects a first remediation action, said first processing comprising:
determining, in accordance with one or more criteria, whether to perform network remediation; and
if it is determined to perform network remediation, performing second processing including:
selecting a network remediation action as the first remediation action; and
performing the network remediation action.

16. A non-transitory computer readable medium comprising code stored thereon that achieves service level objectives, the non-transitory computer readable medium comprising code stored thereon that, when executed, performs a method comprising:
receiving a first service level objective for a first tenant of a data storage system whereby the first tenant has data stored in a first set of one or more devices of the data storage system, said first service level objective including a first value for a first metric, wherein said first tenant is located on a first host and issues I/O operations directed to the first set of one or more devices of the data storage system, wherein the first service level objective denotes a guaranteed level of performance for the first tenant as measured on the first host and the first metric is a performance metric with respect to I/O operations issued by the first tenant;
determining a first calculated value for the first metric using one or more measured values, wherein the one or more measured values used in determining the first calculated value for the first metric are estimates for the first metric as observed from the first host, and the estimates are based on measurements obtained at the data storage system and network between the first host and the data storage system;
determining, using the first calculated value for the first metric, whether the first service level objective for the first tenant is violated; and
responsive to determining that the first service level objective for the first tenant is violated, performing first processing that selects a first remediation action.

17. The non-transitory computer readable medium of claim 16, wherein the one or more measured values used in determining the first calculated value for the first metric are based on measurements for the first metric obtained from the first host.

* * * * *